United States Patent

Mitchell, Jr. et al.

Patent Number: 5,271,718
Date of Patent: Dec. 21, 1993

[54] LIGHTWEIGHT PLATFORM BLADE

[75] Inventors: Robert K. Mitchell, Jr., Hamilton; Mark J. Bailey, Cincinnati, both of Ohio

[73] Assignee: General Electric Company, Cincinnati, Ohio

[21] Appl. No.: 928,557

[22] Filed: Aug. 11, 1992

[51] Int. Cl.$^5$ .............................................. F01D 5/32
[52] U.S. Cl. .................................. 416/215; 416/217; 416/193 A; 416/248
[58] Field of Search ............... 416/193 A, 219 R, 248, 416/220 R, 215, 216, 217

[56] References Cited

U.S. PATENT DOCUMENTS

| | | | |
|---|---|---|---|
| 2,398,140 | 4/1946 | Heppner | 230/134 |
| 2,656,147 | 10/1953 | Brownhill et al. | 253/39.15 |
| 3,661,475 | 5/1972 | Anderson et al. | 416/193 A |
| 3,902,824 | 9/1975 | Sauer | 416/215 |
| 4,451,203 | 5/1984 | Langley | 416/215 |
| 4,940,389 | 7/1990 | Luxenburger | 416/193 A |
| 5,007,800 | 4/1991 | Hacault et al. | 416/217 |
| 5,044,886 | 9/1991 | Stenneler | 416/215 |

FOREIGN PATENT DOCUMENTS

| | | | |
|---|---|---|---|
| 0195301 | 3/1985 | Japan | 416/192 |
| 0652099 | 4/1951 | United Kingdom | 416/220 |
| 0724123 | 2/1955 | United Kingdom | 416/215 |

OTHER PUBLICATIONS

I. E. Treager, "Aircraft Gas Turbine Engine Technology," 1979, pp.: i, ii, 469–477.

Primary Examiner—Edward K. Look
Assistant Examiner—Mark Sgantzos
Attorney, Agent, or Firm—Jerome C. Squillaro

[57] ABSTRACT

A rotor blade for a gas turbine engine includes an airfoil, platform and dovetail. The platform has top and bottom surfaces, with a plurality of pockets disposed in the bottom surface for reducing weight of the platform, with the pockets defining a plurality of continuous beams extending along the platform which provide structural stiffness to the platform to avoid resonance vibration thereof during operation.

9 Claims, 4 Drawing Sheets

LIGHTWEIGHT PLATFORM BLADE

The present invention relates generally to gas turbine engines, and, more specifically, to a rotor blade having a lightweight platform for reducing centrifugally generated loads while maintaining acceptable strength.

BACKGROUND OF THE INVENTION

A gas turbine engine such as that used for powering an aircraft includes rotor blades such as those found in a compressor thereof which are suitably fixedly joined to a rotor disk for accommodating centrifugal and aerodynamic loads generated during operation. As the rotor disk rotates during operation, the blades joined thereto are centrifuged radially outwardly, with the centrifugal loads generated thereby being suitably channeled to the rotor disk at stresses below predetermined stress limits for ensuring an effective useful life of the bladed disk combination.

More specifically, the blade includes a dovetail which is retained in a complementary dovetail groove in the perimeter of the rotor disk for retaining the blade thereto during operation. The blade dovetail may either be an axial-entry type which is disposed in a complementary axially extending dovetail groove in the rotor disk, or may be a circumferential-entry type disposed in a complementary circumferentially extending groove in the perimeter of the rotor disk. In the latter case, for example, the blade dovetail has a width extending in the circumferential direction which is suitably large to provide a broad support for stabilizing the blade in the disk during operation and for obtaining acceptable stress levels therein.

The rotor blade typically also includes an integral platform disposed at the juncture of the blade airfoil and dovetail which provides a radially inner boundary for the airflow channeled over the airfoil during operation. The platform extends both axially upstream and downstream from the airfoil, as well as circumferentially from both sides of the airfoil to abut adjacent platforms of adjacent rotor blades for providing a substantially continuous radially inner flowpath surface in the circumferential direction at the roots of the several airfoils used in a blade row stage.

As the diameter of the rotor disk increases for larger engine designs relative to the number of blades used in a blade row, the resulting circumferential width of each platform also increases. The additional weight due to the larger platforms increases centrifugal loads which must be carried by the rotor disk, which, therefore, requires a larger disk to accommodate the centrifugal loads within acceptable stress limits. Accordingly, a lightweight platform is desired for this large diameter rotor disk application, but the lightweight platform must still have suitable structural strength and stiffness to suppress natural resonance vibratory response thereof during operation within acceptable stress limits.

SUMMARY OF THE INVENTION

A rotor blade for a gas turbine engine includes an airfoil, platform and dovetail. The platform has top and bottom surfaces, with a plurality of pockets disposed in the bottom surface for reducing weight of the platform, with the pockets defining a plurality of continuous beams extending along the platform which provide structural stiffness to the platform to avoid resonance vibration thereof during operation.

BRIEF DESCRIPTION OF THE DRAWING

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
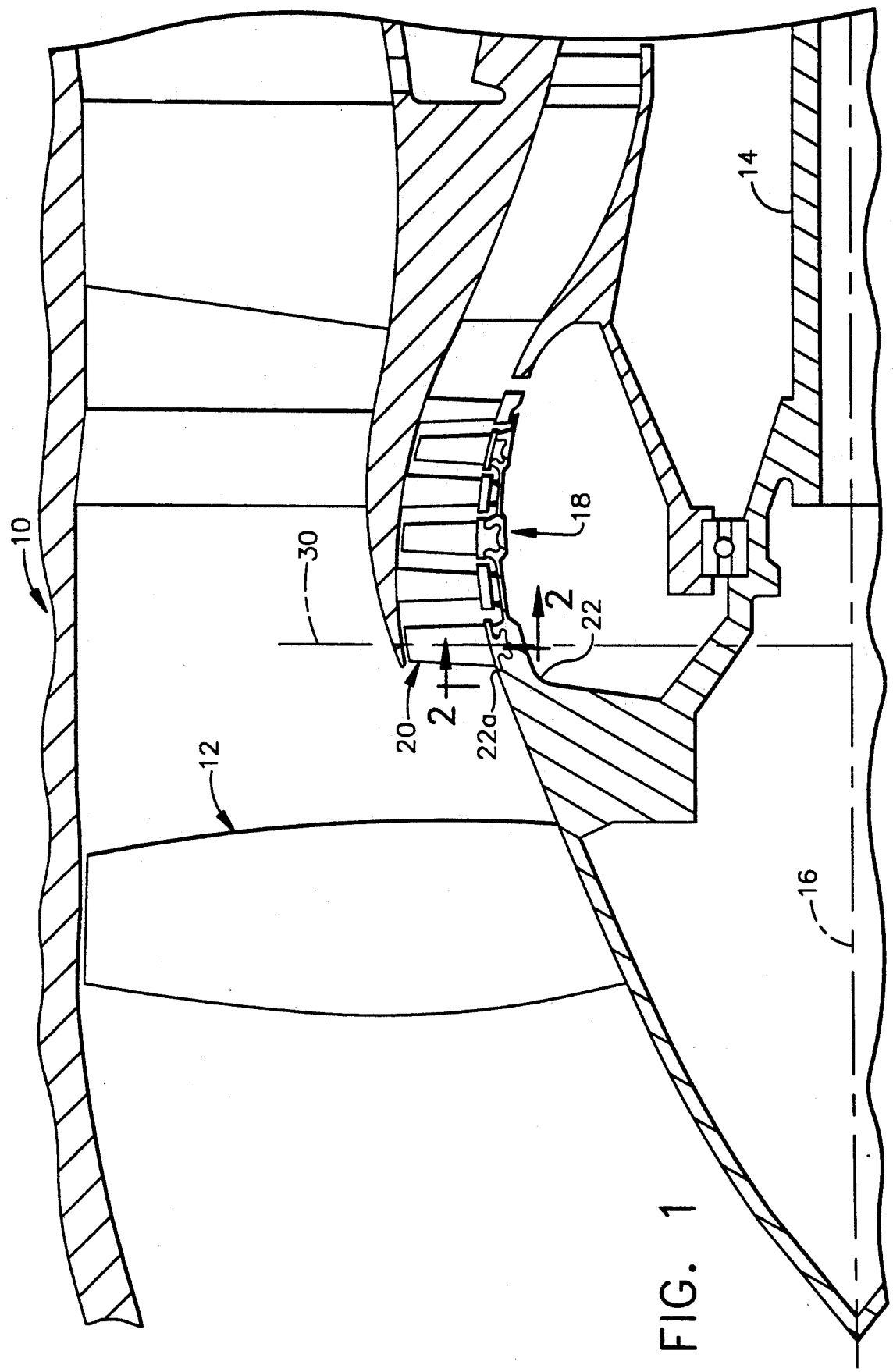
FIG. 1 is an axial, partly sectional view of a fan and compressor portion of an exemplary aircraft gas turbine engine having an improved rotor blade joined to a rotor disk therein.

Illustrated schematically in FIG. 1 is a portion of an exemplary turbofan aircraft gas turbine engine 10 including a conventional fan 12 mounted to a fan shaft 14 for rotation about a longitudinal or axial centerline axis 16 thereof. The engine 10 further includes a multi-stage low pressure compressor 18, also known as a booster compressor, which is also joined to the fan shaft 14 for rotation therewith.

Figure 2:
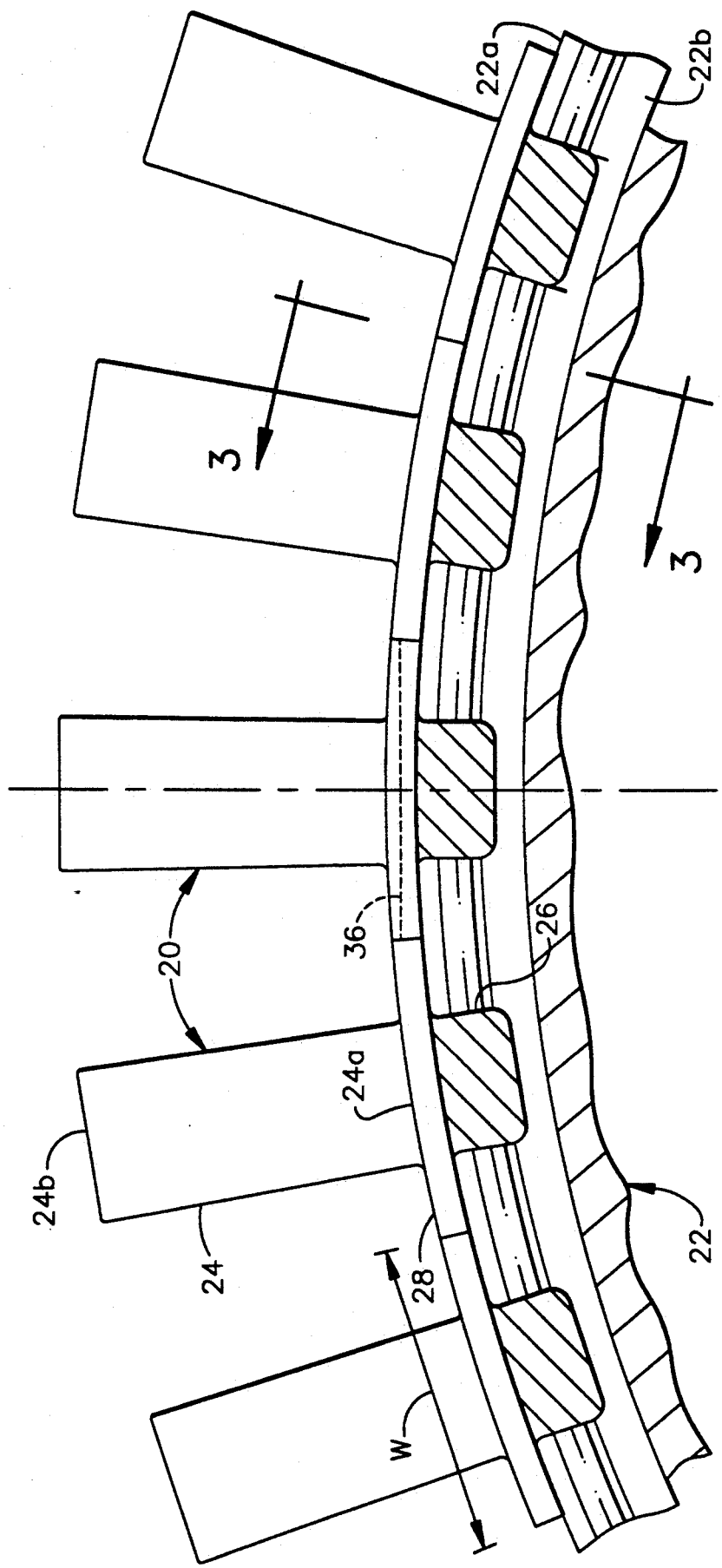
FIG. 2 is a transverse, partly sectional view of a portion of the first stage compressor blade row illustrated in FIG. 1 taken along line 2—2.

Referring to both FIGS. 1 and 2, the compressor 18 includes three exemplary blade row stages each of which includes a plurality of circumferentially spaced apart rotor blades 20 joined to an annular rotor disk 22. As shown in FIG. 2, each of the blades 20 includes a conventional airfoil 24 having a radially inner root 24a and a radially outer tip 24b. A conventional circumferential-entry dovetail 26 extends radially inwardly from the airfoil 24 and is fixedly joined thereto by being formed integrally with the airfoil root 24a. A blade platform 28 in accordance with one embodiment of the present invention forms a radially inner flowpath surface for the airflow channeled between the blades 20, and is integrally formed with the blade 20 at the juncture between the airfoil root 24a and the dovetail 26.

Figure 3:
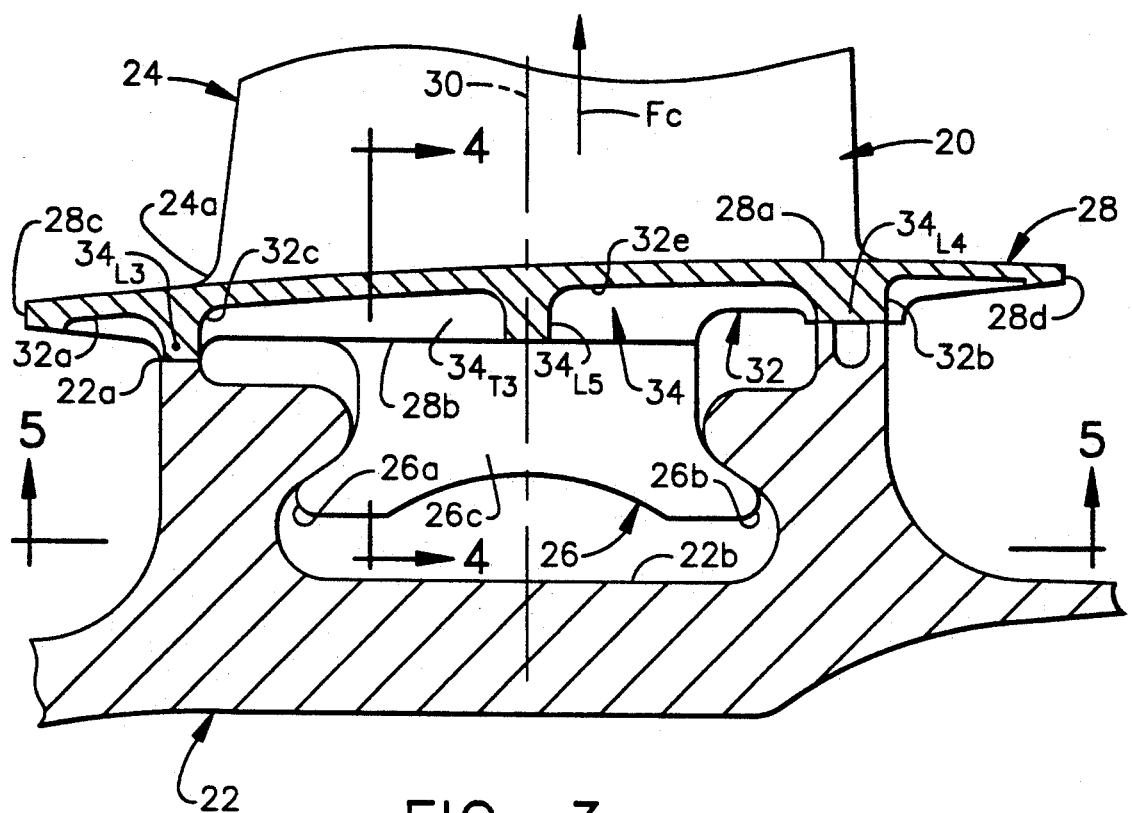
FIG. 3 is an axial, partly sectional view of one of the rotor blades illustrated in FIG. 2 joined to the rotor disk and taken along line 3—3 therein, as also viewed along line 3—3 of FIG. 5.

As shown in FIGS. 2 and 3, the rotor disk 22 includes a perimeter 22a at a radius from the centerline axis 16, and a conventionally configured, circumferentially extending dovetail groove 22b which is complementary in configuration to the dovetail 26 for retaining the blade 20 to the rotor disk 22. A plurality of the blades 20 are contained in the dovetail groove 22b with adjacent ones of the platforms 28 abutting each other as shown in FIG. 2. In an exemplary design of the compressor 18 having a relatively large diameter relative to the total number of blades 20 disposed around the rotor disk 22, the circumferential width W, as shown in FIG. 2, of each of the platforms 28 becomes relatively large for bridging the circumferential gaps between adjacent airfoils 24 to provide a substantially continuous inner boundary for the airflow channeled between the airfoils 24. The increased weight due to a conventional blade platform requires a large dovetail, and in turn a larger rotor disk 22, to accommodate to increased centrifugal loads generated thereby during operation which must be carried by the rotor disk 22 within acceptable stress limits. The centrifugal force or load, designated $F_c$, is illustrated schematically in FIG. 3 and acts in a radially outward direction generally parallel to a radial axis 30 extending outwardly from the centerline axis 16 and through each of the rotor blades 20. The platform 28 includes a flat or aerodynamically smooth first, or top, radially outer surface 28a which faces toward the airfoil 20 for providing a flowpath boundary for the airflow over the airfoil 24.

Figure 4:
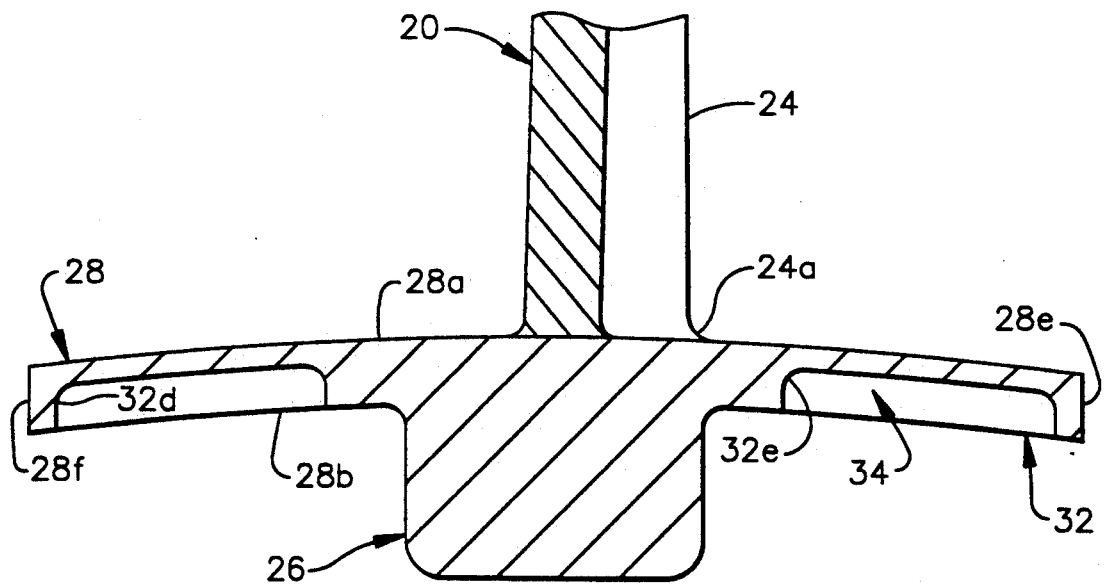
FIG. 4 is a transverse sectional view of a portion of the rotor blade illustrated in FIG. 3 taken along line 4—4, as also viewed along line 4—4 of FIG. 5.
Figure 5:
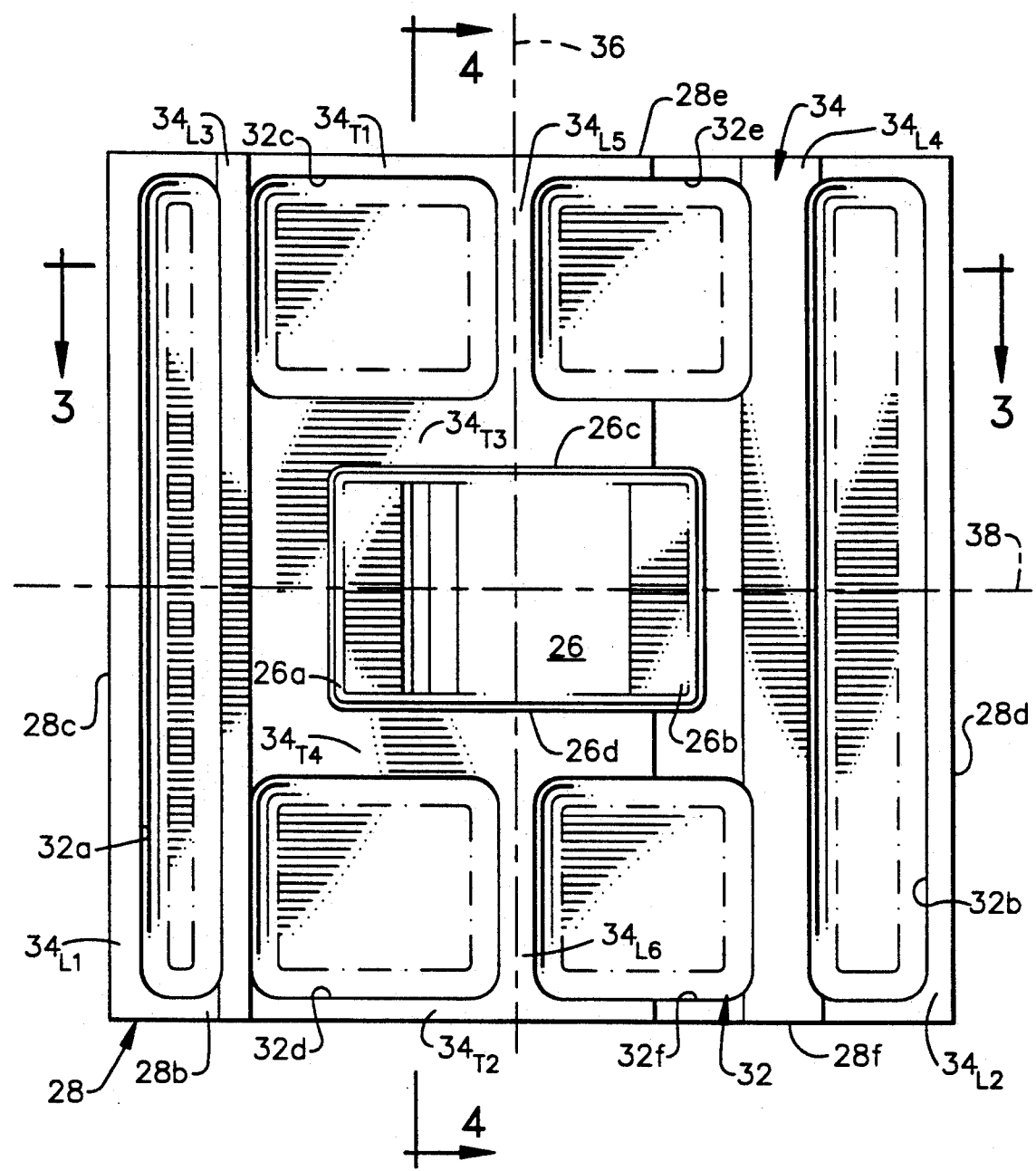
FIG. 5 is an upwardly facing view of the bottom of the platform and dovetail illustrated in FIG. 3 taken along line 5—5.

In accordance with the present invention, the platform 28 also includes a bottom, or second, radially inner surface 28b facing oppositely to the top surface 28a, which includes a plurality of empty and spaced apart pockets or cavities 32 extending into the platform 28 toward the top surface 28a as shown in FIGS. 3–5. The pockets 32 are preferably sized, configured, and positioned in accordance with the present invention for reducing weight of the platform 28 while providing suitable structural stiffness, or moment of inertia, to reduce or prevent resonance vibration of the platform 28 during operation of the rotor blade 20. The pockets 32 are preferably positioned in the platform 28 for defining a plurality of continuous reinforcing structural ribs of beams 34 which fully laterally surround the pockets 32.

More specifically, as shown in FIG. 5, each of the platforms 28 includes orthogonal first and second axes 36 and 38, with the platform first axis 36 being a longitudinal, or tangential axis extending tangentially to the rotor disk 22 (see FIG. 2) for this exemplary circumferential-entry dovetail 26, and the platform second axis 38 being an axial axis transverse to the longitudinal first axis 36 and extending coextensively with the axial centerline axis 16 of the rotor disk 22 in the forward-to-aft direction generally parallel thereto. The beams 34 defined by the pockets 32 preferably extend along both the platform first and second axes 36, 38 to provide structural stiffness in both directions for increasing the natural resonance vibration frequencies of the platform 28.

A substantially solid rotor blade platform without the pockets 32 would correspondingly be relatively stiff with relatively high natural resonance frequencies which are not ordinarily excited during operation of the rotor blade 20. However, such a platform would also be relatively heavy leading to increased centrifugal loads therefrom as described above which conventionally requires a larger rotor disk for accommodating these loads within acceptable stress limits. By providing the pockets 32 to eliminate unnecessary weight from the platform 28, the beams 34 may remain for adequately providing suitable structural stiffness in the platform 28 for maintaining acceptably high natural resonance frequencies of the platform 28 to prevent undesirable resonance vibration of the platform 28 during operation.

However, the pockets 32 must be suitably placed within the platform 28 for providing predeterminedly positioned beams 34 for accomplishing both objectives of reducing weight while maintaining structural stiffness. The pockets 32 are designated generically by the numeral 32, with individual pockets being described hereinbelow using lower case suffixes, and similarly, the beams 34 are generically identified by the reference numeral 34 with specific beams being identified using subscripts therewith.

As shown in the exemplary embodiment illustrated in FIG. 5, the platform 28 is rectangular and extends or overhangs laterally from the dovetail 26 on all four sides thereof along the platform first and second axes 36, 38. The four sides of the dovetail 26 include a first side 26a representing a conventional dovetail lobe or tang on the upstream side of the dovetail 26; a second dovetail side 26b representing the opposite dovetail lobe or tang disposed on the downstream side of the dovetail 26; a third side 26c representing one of the flat circumferential faces of the dovetail 26; and a fourth side 26d representing the opposite circumferential side of the dovetail 26.

Correspondingly, the platform 28 includes four side edges 28c–f which laterally overhang the dovetail 26 relative to the four sides 26a–d thereof, respectively.

As shown in FIG. 5, the pockets 32 are disposed in the platform 28 preferably in pairs on opposite ones of the dovetail sides, with the beams 34 extending continuously along the platform four side edges 28c–f which ensures that the outer perimeter of the platform 28 is rigid and resistent to vibratory bending thereof. In the preferred embodiment illustrated in FIG. 5, the pockets 32 are disposed in the platform 28 on all four of the dovetail sides 26a–d since the platform 28 overhangs the dovetail 26 along both platform axes 36 and 38. In alternate embodiments wherein insufficient overhand is provided, no pockets would be used therein, but would be used solely where sufficient overhand is provided.

In the exemplary embodiment illustrated in FIG. 5 wherein the platform 28 has a generally square configuration with sufficient overhand on all four sides of the dovetail 26, the pockets 32 include at least four pockets. A first pocket 32a is disposed in the platform 28 along the platform first side edge 28c and on the dovetail first side 26a. A second pocket 32b is disposed in the platform 28 along the platform second side edge 28d and on the dovetail second side 26b. A third pocket 32c is disposed in the platform 28 along the platform third side edge 28e and on the dovetail third side 26c. And a fourth pocket 32d is disposed in the platform 28 along the platform fourth side edge 28f and on the dovetail fourth side 26d. In this exemplary embodiment, the first, second, third, and fourth pockets 32a–d are rectangular, with the first and second pockets 32a,b being disposed as one pair on opposite sides, i.e. 26a,b, of the dovetail 26, and the third and fourth pockets 32c,d being disposed as another pair on opposite sides, i.e. 26c,d, of the dovetail 26.

Since the dovetail 26 is a circumferential-entry dovetail in this exemplary embodiment, the first and second pockets 32a,b are elongate in the tangential direction and extend between the platform third and fourth side edges 28e,f to define four longitudinal beams $34_{L1-L4}$ which extend between the platform third and fourth side edges 28e,f and parallel to the platform first axis 36. The third and fourth pockets 32c,d are preferably disposed between the first and second pockets 32a,b to define four transverse beams $34_{T1-T4}$ extending between the platform first and second side edges 28c,d and parallel to the platform second axis 38. In this way, the four axially spaced apart longitudinal beams $34_{L1-L4}$ are disposed perpendicularly to the four tangentially spaced apart transverse beams $34_{T1-T4}$ in a waffle-like configuration to provide stiffness in both the circumferential and axial directions parallel to the first and second axes 36, 38. The first and second longitudinal beams $34_{L1}$ and $34_{L2}$, and the first and second transverse beams $34_{T1}$ and $34_{T2}$ define a continuously rigid outer perimeter of the platform 28 along the respective four platform side edges 28c-f. The third and fourth longitudinal beams $34_{L3}$ and $34_{L4}$ extend along the dovetail sides of the respective first and second pockets 32a,b and may be conventionally used as seal lands which are disposed adjacent to respective radial extensions of the rotor disk 22 as illustrated in FIG. 3. And, the third and fourth transverse beams $34_{T3}$ and $34_{T4}$ extend integrally between the third and fourth longitudinal beams $34_{L3}$ and $34_{L4}$ along the dovetail third and fourth sides 26c and 26d, respectively for providing additional stiffness.

Referring again to FIG. 5, the pockets 32 preferably further include a fifth pocket 32e disposed in the platform 28 adjacent to the third pocket 32c along the platform third side edge 28e, and a sixth pocket 32f disposed in the platform 28 adjacent to the fourth pocket 32d along the platform fourth side edge 28f. Although both the third and fourth pockets 32c,d could extend completely between the third and fourth longitudinal beams $34_{L3}$ and $34_{L4}$, it is preferred that two pockets are used in each location for providing additional stiffness. More specifically, the third and fifth pockets 32c,e define therebetween a fifth longitudinal beam $34_{L5}$ which extends between the dovetail third side 26c and the platform third side edge 28e for providing additional stiffness for that overhang portion of the platform 28. And, the fourth and sixth pockets 32d,f define therebetween a sixth longitudinal beam $34_{L6}$ which extends between the dovetail fourth side 26d and the platform fourth side edge 28f to provide additional stiffness for that overhang portion of the platform 28.

The resulting platform 28, accordingly, includes the several pockets 32 which define the longitudinal beams $34_{L1-L6}$ which extend parallel to the platform first axis 36 and tangentially to the rotor disk 22, and the transverse beams $34_{T1-T4}$ which extend parallel to the platform second axis 38 and generally parallel to the axis centerline axis 16. In this way, structural stiffness is provided in the platform 28 parallel to both platform axes 36 and 38, with the several beams 34 providing rigidity laterally outwardly from the dovetail 26 for supporting the overhangs of the platform 28 for reducing or preventing resonance vibration thereof during operation. Unnecessary material and weight are therefore removed from the platform 28 which, in turn, reduces the centrifugal force $F_c$ which must be carried by the dovetail 26 and the rotor disk 22 in which it is secured. Accordingly, the weight of the entire blade 20 is reduced, and in turn, the weight of the rotor 22 may also be reduced for providing a total weight savings to the bladed-disk assembly which improves specific fuel consumption (SFC) of the engine.

As shown in FIG. 3, the transverse beams $34_{T1-T4}$, third transverse beam $34_{T3}$ for example, preferably taper from a maximum thickness at the center of the dovetail 26 to minimum thicknesses adjacent the platform first and second side edges 28c,d. In this way, additional weight may be removed from the platform 28 due to the decreasing taper from adjacent the dovetail 26 and axially outwards toward the platform first and second side edges 28c,d.

While there have been described herein what are considered to be preferred embodiments of the present invention, other modifications of the invention shall be apparent to those skilled in the art from the teachings herein, and it is, therefore, desired to be secured in the appended claims all such modifications as fall within the true spirit and scope of the invention. For example, although the invention has been described with respect to an exemplary circumferential entry dovetail 26, it may be practiced for conventional axial-entry dovetails.

Accordingly, what is desired to be secured by Letters Patent of the United States is the invention as defined and differentiated in the following claims:

1. A gas turbine engine blade comprising:
   an airfoil having a root and a tip;
   a platform disposed at said airfoil root and including:
      a top surface facing toward said airfoil for providing a flowpath boundary for airflow over said airfoil;
      a bottom surface facing oppositely to said top surface; and
      orthogonal first and second axes; and
   a dovetail extending from said platform bottom surface for mounting said blade to a rotor disk;
   said platform bottom surface having a plurality of pockets extending toward said platform top surface for reducing weight of said platform, said pockets being positioned in said platform for defining a plurality of continuous beams extending along both said first and second platform axes and fully surrounding said pockets.

2. A blade according to claim 1 wherein:
   said platform is rectangular and extends laterally from said dovetail on four sides thereof along said platform first and second axes;
   said platform includes four side edges; and
   said pockets are disposed in said platform in pairs on opposite ones of said dovetail sides with said beams extending continuously along said platform four side edges.

3. A blade according to claim 2 wherein said pockets are disposed in said platform on all four of said dovetail sides.

4. A blade according to claim 3 wherein said pockets comprise:
   a first pocket disposed in said platform on a first side of said dovetail;
   a second pocket disposed in said platform on a second side of said dovetail;
   a third pocket disposed in said platform on a third side of said dovetail; and
   a fourth pocket disposed in said platform on a fourth side of said dovetail.

5. A blade according to claim 4 wherein:
   said first and second pockets are rectangular and are disposed as one pair on opposite sides of said dovetail; and
   said third and fourth pockets are rectangular and are disposed as another pair on opposite sides of said dovetail.

6. A blade according to claim 5 wherein:
   said first and second pockets are elongate and extending between said platform third and fourth side edges to define longitudinal beams extending between said platform third and fourth side edges and parallel to said platform first axis; and
   said third and fourth pockets are disposed between said first and second pockets to define transverse beams extending between said platform first and second side edges and parallel to said platform second axis.

7. A blade according to claim 6 in combination with said rotor disk, said rotor disk having a circumferential dovetail groove, and wherein:

said dovetail is a circumferential-entry dovetail being complementary in configuration with said dovetail groove and disposed therein for mounting said blade to said rotor disk;

said platform first axis extends tangentially to said rotor disk;

said platform second axis extends coextensively with an axial centerline axis of said rotor disk;

said longitudinal beams extend tangentially to said rotor disk; and said transverse beams extend parallel to said axial centerline axis.

8. A blade and disk combination according to claim 7 wherein said pockets further comprise:
 a rectangular fifth pocket disposed in said platform adjacent to said third pocket along said platform third side edge; and
 a rectangular sixth pocket disposed in said platform adjacent to said fourth pocket along said platform fourth side edge.

9. A blade and disk combination according to claim 8 wherein said transverse beams taper from a maximum thickness at said dovetail to a minimum thickness adjacent said platform first and second side edges.

* * * * *